United States Patent [19]

Harris et al.

[11] 4,357,806
[45] Nov. 9, 1982

[54] CONTROLLER FOR VARIABLE AIR VOLUME COOLING SYSTEM

[75] Inventors: Charles G. Harris, Coon Rapids, Minn.; Erwin P. Mora, Lancaster, S.C.; Mahendra P. Singh, Columbus, Ind.; David P. Solberg, Scandia, Minn.

[73] Assignee: Dana Corporation, Toledo, Ohio

[21] Appl. No.: 251,528

[22] PCT Filed: Aug. 28, 1980

[86] PCT No.: PCT/US80/01110
 § 371 Date: Oct. 10, 1980
 § 102(e) Date: Oct. 10, 1980

[87] PCT Pub. No.: WO82/00874
 PCT Pub. Date: Mar. 18, 1982

[51] Int. Cl.$^3$ .............................................. F25D 17/04
[52] U.S. Cl. ........................................ 62/186; 236/49; 474/11
[58] Field of Search ................ 236/49, 15 C; 62/186; 474/11; 165/20; 74/230, 17

[56] References Cited

U.S. PATENT DOCUMENTS

| | | | |
|---|---|---|---|
| 2,130,995 | 9/1938 | Henney | 236/10 |
| 3,349,785 | 10/1967 | Duffy | 474/11 X |
| 3,653,589 | 4/1972 | McGrath | 236/49 |
| 3,887,000 | 6/1975 | Pinckaers | 165/2 G |
| 3,954,018 | 5/1976 | O'Berto | 474/11 |
| 3,964,675 | 6/1976 | Euchner, Jr. | 236/15 C |
| 4,072,268 | 2/1978 | Perris | 236/78 C |

*Primary Examiner*—William E. Wayner
*Attorney, Agent, or Firm*—Frank B. McDonald; Robert C. Lucke

[57] ABSTRACT

This invention is directed to a variable air volume cooling system for a building which utilized changes in the diameter of the belt going around a two piece driver pulley and a follower two piece driven pulley to effect changes in fan speed and, accordingly, the air volume supplied. A control means to operate a servo-motor connected to the driver pulley provides for separating the two piece driven pulley to slow the fan, driving the two pieces of the driven pulley together to speed up the fan, and for maintaining the same speed should a desired temperature range be obtained. The control compares the temperature of the area to be cooled with the speed of the fan to produce its outputs. Deadband operation is provided to eliminate toggling and other excesses of output reversals.

3 Claims, 8 Drawing Figures

CONTROLLER FOR VARIABLE AIR VOLUME COOLING SYSTEM

DESCRIPTION

BACKGROUND OF THE INVENTION

The present invention relates generally to variable air volume systems for maintaining a desired temperature range within buildings and, more particularly, to an improved controller for enabling the required air volume to be supplied.

In variable air volume systems for cooling the interiors of buildings, the cooling coils are maintained at a substantially constant temperature by a continuously operating compressor while a controller establishes the volume of air forced through the cooling coils and distributed throughout the building to maintain a desired temperature range. This controller is connected to operate a speed changing means which results in fan speed changes to vary the volume of air. The inputs to the controller are means sensing temperature of the areas of the building being cooled and a feedback indicative of the speed of the fan.

In some prior variable air volume systems, a heat cycle is provided before the cooling is introduced. In some systems, direct current drives the fans, some have eddy current drive means, while others use two speed motors with variable inlet vanes. The alternating current fan drive and controller of this invention operate with a significantly shorter payback period than the above alternatives. This invention further contributes considerable amounts of energy saved. Since the power consumed is a function of the cube of the fan speed, the variable speed provides fan operation at speeds substantially below maximum a considerable part of the operating time. The initial cost is low; and the maintenance requirements, efficiency at partial loads, overload capacity, complexity of controls, and the requirements of maintenance training are favorable to the structure of this invention.

In the prior art, the variable pitch split pulley transmission system was utilized in cooling of engines such as is shown in U.S. Pat. No. 3,872,842 issued Mar. 25, 1975 to Jackson C. Medley. In the application of such speed changing mechanism to air conditioning systems, as in the present invention, unique control circuitry is contributed.

SUMMARY OF THE INVENTION

This invention incorporates: a variable speed means for the fan providing an infinite number of fan speeds; and a controller capable of providing precise fan speed operation to accurately control the temperature within a building. The variable speed fan drive is a fixed-center belt drive. It consists of a mechanically adjustable driver pulley, a spring loaded driven pulley, a variable speed belt and mounting collets for the pulleys. An integrally mounted servo-motor adjusts the pitch of the driver pulley. The driven pulley, being spring loaded, automatically adjusts to pitch diameter changes of the driver pulley to maintain proper belt tension while providing infinitely adjustable fan speeds.

The controller provides for connection to existing sensing means such as thermostats, pressure gauges and the like to accept therefrom an analog input to produce an output which signals to the servo-motor with a positive output to speed up the fan, with no pulse to remain constant, or with a negative output to slow down the fan. A feedback signal from the shaft of the fan provides a reference signal that is compared with a signal indicative of the temperature of the area to be cooled to determine the succeeding operation of the system. Adjustments determine the maximum and minimum speeds of the fan as well as a deadtime interval which is representative of the temperature variation that is acceptable before a speed change is effected. The output of the controller is applied to the servo-motor and effects speed changes by adjusting the pitch of the driver pulley.

Also, provision is made for controlling a return system when the supply cooling air could cause doors to close or windows to be blown out. This return system control is coupled to the input controller and provides a percentage differential so that the return air is removed at a rate slightly slower than the supply air.

It is, therefore, an object of this invention to provide a controller for a variable air volume cooling system which eliminates the heat cycle required in former systems.

Another object of this invention is to provide a very efficient cooling system utilizing pitch adjustment of a driver pulley to provide an infinite number of speeds for the fan.

Still another object of this invention is to provide a controller which utilizes analog inputs and produces a positive, negative, or zero output to operate the servo-motor to precisely control the speed of the cooling fans.

An object is to provide a deadtime in the control cycle of the variable air volume cooling system.

Another object is to provide a controller for a cooling system which provides precise temperature level control by varying the air volume produced by a fan.

Still another object of this invention is to provide a controller for operating a fan in a cooling system with minimum consumption of power.

A still further object is to reduce the noise levels of the system by the variable fan speed. Significant operation time utilizes less than maximum fan speed with considerably less noise.

It is another object of this invention to provide a continuous comfort level by having the air constantly circulating in varying amounts to accommodate for temperature requirements.

It is an object of this invention to provide a controller for a variable air volume cooling system in which a return fan is provided with a control to keep the speed of the return fan a fixed proportion lower than the speed of the supply fan.

Other objects and advantages of the invention will be apparent from the following detailed description and the accompanying drawings, in which.

FIGS. 3A, 3B, 3C, 3D, and 3E are detailed showings of the circuit of the speed controller for the supply fan.

DETAILED DESCRIPTION OF A PREFERRED EMBODIMENT

Figure 1:
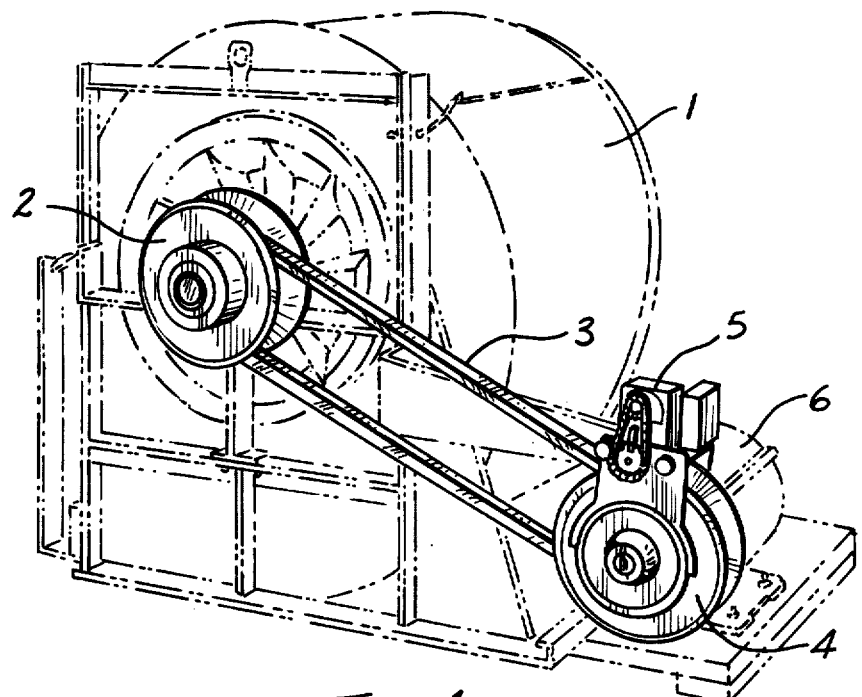
FIG. 1 is a pictorial view of a speed changing mechanism for a fan.

Turning now to the drawings in which like numbers refer to the same elements throughout the drawings, FIG. 1 shows a supply fan 1 for a variable air volume cooling system. Driving the fan 1 is a driven pulley 2 which has two separable sheaves which are spring loaded. A belt 3 connects driven pulley 3 to a driving pulley 4 which also has two separable sheaves to effect changes in pulley diameters to lessen or increase the pulley size relationship between the driving and the driven pulleys. The spring loading of the driven pulley causes the belt to automatically adjust to a new diameter in response to changes in the driving pulley, thereby keeping the belt taut during operation. A servo-motor 5 is mounted so as to be in position to move the two sheaves of driving pulley 4 to effect the speed changes controlled by the controller of this invention. The driving motor 6 has the driving pulley 4 mounted thereon to provide the turning of the fan. The speed of the driving motor 6 is constant.

Figure 2:
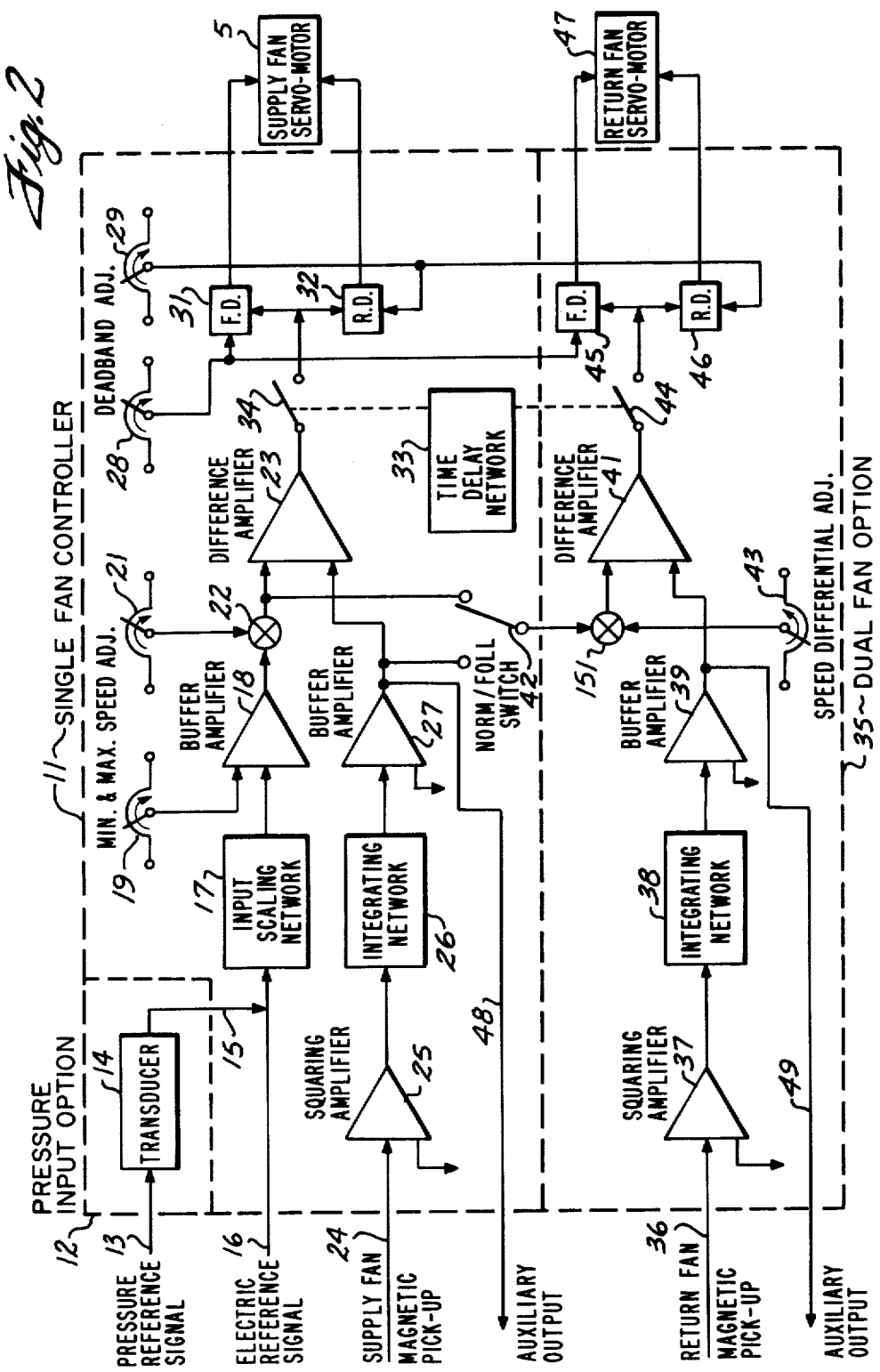
FIG. 2 is a block diagram of a speed controller for both supply and return fans.

FIG. 2 shows the principal functions of the controller in block form.

The single fan controller 11 is shown with an optional pressure input 12 which has a pressure reference signal input 13 applied to a transducer 14 wherein the pressure signal is converted into an electrical reference signal delivered through connector 15.

The electrical reference signal applied at terminal 16 is an input for an input scaling network 17 to which connector 15 is also an input. The scaling network 17 divides the input signals to a proper voltage level for inputing difference amplifier 23. The reference signal at terminal 16 is the output of a temperature sensing device, such as a thermostat, located in the area to be cooled. The output of input scaling network 17 is applied and an input to a buffer amplifier 18 to which also the output of a minimum speed adjustment 19 is connected as an input. A maximum speed adjustment 21 is connected to a combining circuit 22 as is the output of the buffer amplifier 18. The output of the combining circuit 22 is connected as one of the inputs to the difference amplifier 23.

A magnetic pick-up is mounted on the supply fan structure so as to be able to be affected by the passing teeth of a gear mounted to move with the fan; thereby inducing the output of the pick-up with a signal representative of the speed of the fan. This signal is applied at a terminal 24 as an input to a squaring amplifier 25 for pulse shaping, the output of which is a frequency as an input to an integrating network 26. The network 26 changes the frequency to a voltage representative of the fan speed. The output of the network 26 is connected as an input to buffer amplifier 27 the output of which is supplied as the second input to difference amplifier 23.

In the single fan controller, the normal input at terminal 16 is the analog output of a thermostat located in the area to be cooled. The input at terminal 24 is a digital output of the magnetic pick-up receiving pulses from the gear means coupled to the supply fan. The difference amplifier compares these analog and digital inputs and produces outputs accordingly; should the temperature be higher than the desired temperature, the difference amplifier 23 will produce a positive output to the servo-motor which will increase the fan speed; when the temperature approaches the desired range, the difference amplifier 23 will produce a signal to keep the fan speed constant, that is, the output is zero; and when the temperature in the area to be cooled falls below a desired range, a negative output is produced to slow the fan.

The range of the desired temperature is provided by a pair of deadband adjustment means 28 and 29. The means 28 is connected to the forward driver 31 and the means 29 is connected to the reverse driver 32 to eliminate unnecessary toggling of the oppositely directed drivers.

A time delay network 33 operates a solid state switch 34 which is in the connection between the output of the difference amplifier 23 and the two drivers for the supply fan servo-motor. Network 33 provides, at the initiation of the operation of the fan and control, for switch 34 to be open to deactivate this control in order to permit the fan 1 to arrive at operating speed before this control takes over speed regulation.

The forward driver 31 utilizes the positive outputs of difference amplifier 23 to produce an enabling input to supply fan servo-motor 5 with a forward operation effecting a closing of the sheaves of the driver pulley 4 to increase the speed of the fan 1. The reverse driver 32 utilizes the negative outputs of difference amplifier 23 to produce an enabling input to supply fan servo-motor 5 with a reverse operation effecting an opening of the sheaves of the driver pulley to decrease the speed of the fan 1. A zero output from difference amplifier 23 does not enable either driver 31 or 32 with the result that the servo-motor is not activated and the speed of the fan remains constant.

The dual fan option 35 includes a return fan magnetic pick-up output signal applied to input line 36. The input 36 is connected as an input to a squaring amplifier 37 which produces a pulse train output in which the pulse widths are the same and in which the frequency is proportional to the speed of the return fan. The output of the squaring amplifier 37 is connected as the input to an integrating circuit 38 which converts the digital frequency signal to produce an output of an analog voltage the level of which is proportional to the frequency of the previous stage. The output of network 38 is applied to a buffer amplifier 39 with its check valve function as the final shaper of the input signal representative of the speed of the return fan that is applied to a difference amplifier 41 as a signal to be compared so as to set the return fan speed. The other signal to be compared by the difference amplifier 41 is the output of buffer amplifier 18 which is the shaped electric reference signal from the temperature sensing means. When the normal-follow switch is connected in the normal mode, the output of buffer amplifier 18 is applied as the second input to difference amplifier 41. In a follow mode, the output of buffer amplifier 27 is applied as the second input to the difference amplifier 41 which provides that the return fan operate under the control of the speed of the supply fan. A speed differential adjustment 43 is connected to the said second input to the differential amplifier 41 to lower the voltage of said second input to establish a slower speed for the return fan than the supply fan. A solid state switch 44 operated by time delay network 33 is provided so that there is no speed control of the return fan by this controller during the time the return fan starts and speeds up to operating speed. This assures the presence of a proper feedback signal when the controller is cut on to regulate the speed of the return fan.

In operation, with switch 44 closed, as discussed above in regards to switch 34, the output of the difference amplifier 41 is applied as the inputs to return fan forward driver 45 and return fan reverse driver 46. If the last said output is positive, the forward driver 45 provides an enabling signal to return fan servo-motor 47 to speed up the return fan. If the last said output is negative, the reverse driver 46 provides an enabling signal to return fan servo-motor 47 to slow down the return fan. Should the output be zero, no enabling signal would arrive at the servo-motor and the return fan would remain constant.

Since the elements of this circuit present precise results, the output of the difference amplifier 41; and also amplifier 23, that is zero is a very narrow band between the forward and the reverse signals. The deadband controls provide for a wider deadband to prevent toggling or disruption of smooth operation.

Manual speed adjustments, not shown in FIG. 2, are available to set the fan speeds manually without utilizing the controlling functions of the circuitry.

An auxiliary output 48 is provided from the output of the buffer amplifier 27 representative of the signal from the magnetic pick-up on the supply fan. An auxiliary output 49 is provided from the output of the buffer amplifier 39 representative of the signal from the magnetic pick-up on the return fan. These auxiliary outputs are used as inputs to devices to display and monitor speeds in a central control room; they can be used to control exhaust air and fresh air intake dampers. Further, load shedding can be accomplished by a microprocessor to cut off or slow down fans as a power ceiling is reached by utilizing such fan speeds as are available from the auxiliary outputs.

The controller of FIG. 2 is a comparator device which uses negative feedback logic. It compares an actual condition with the required, or desired, condition. Whenever the error between the actual and the required conditions exceeds acceptable limits, the controller sends a control signal to bring this error to within the acceptable limits. The two inputs of this invention that are compared are: the analog voltage or current outputs of thermostats or other temperature sensing transducers in an area to be cooled; and the digital voltage output of the pick-up which represents supply fan speed. The temperature is the actual condition and the fan speed is the desired condition which reacts in response to temperature changes. The circuitry compares the inputs and provides for increasing or decreasing the fan speed to accomplish desired temperature adjustments. With the fan constantly operating, and with the circulated air being continuously cooled, the comfort level of the cooled area is maintained well within desired limits. The circuit of FIG. 2 includes means for establishing minimum and maximum fan speeds. Also deadband adjustments establish the amount of temperature change experienced by the cooled area before the output of the difference amplifier 23 can be utilized to activate a bidirectional triode thyristor, also known as a triac, to apply an AC voltage to a servo-motor.

In cases where a return fan is employed to reduce the pressures created by the supply, this control provides a mode operation for the return that is a function of the thermostat utilized by the supply fan or a mode in which the speed of the return fan is a function of the speed of the supply fan. A control is provided to establish a differential between the speed of the supply fan and the speed of the return fan.

DETAILED DESCRIPTION OF THE CIRCUIT SHOWN IN FIG. 3

Figure 3:
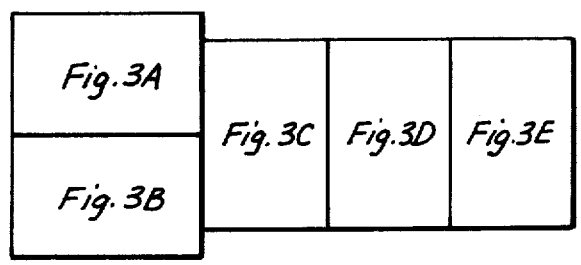
FIG. 3 is representation of the connecting arrangement of FIGS. 3A, 3B, 3C, 3D, and 3E.

Turning now to the circuitry shown in FIG. 3, a conventional power supply, i.e., power mains, is connected across terminals 51 and 52. A circuit power supply 50 is connected to terminals 51 and 52. The DC output of circuit power supply 50 available at terminals 53, which is 15 volts positive, terminal 54, which is 15 volts negative, and a zero ground 55 provide power supplies for the amplifiers, controls, and the like, of this circuit. The DC output at terminals 258 and 247 provide biasing voltage for the optically isolated drivers and the triacs, respectively. Fuse 56 is connected at the input to the power supply on the positive side and a metal oxide varister 57 is connected across the input power supply to absorb high voltage transients.

Figure 3A:
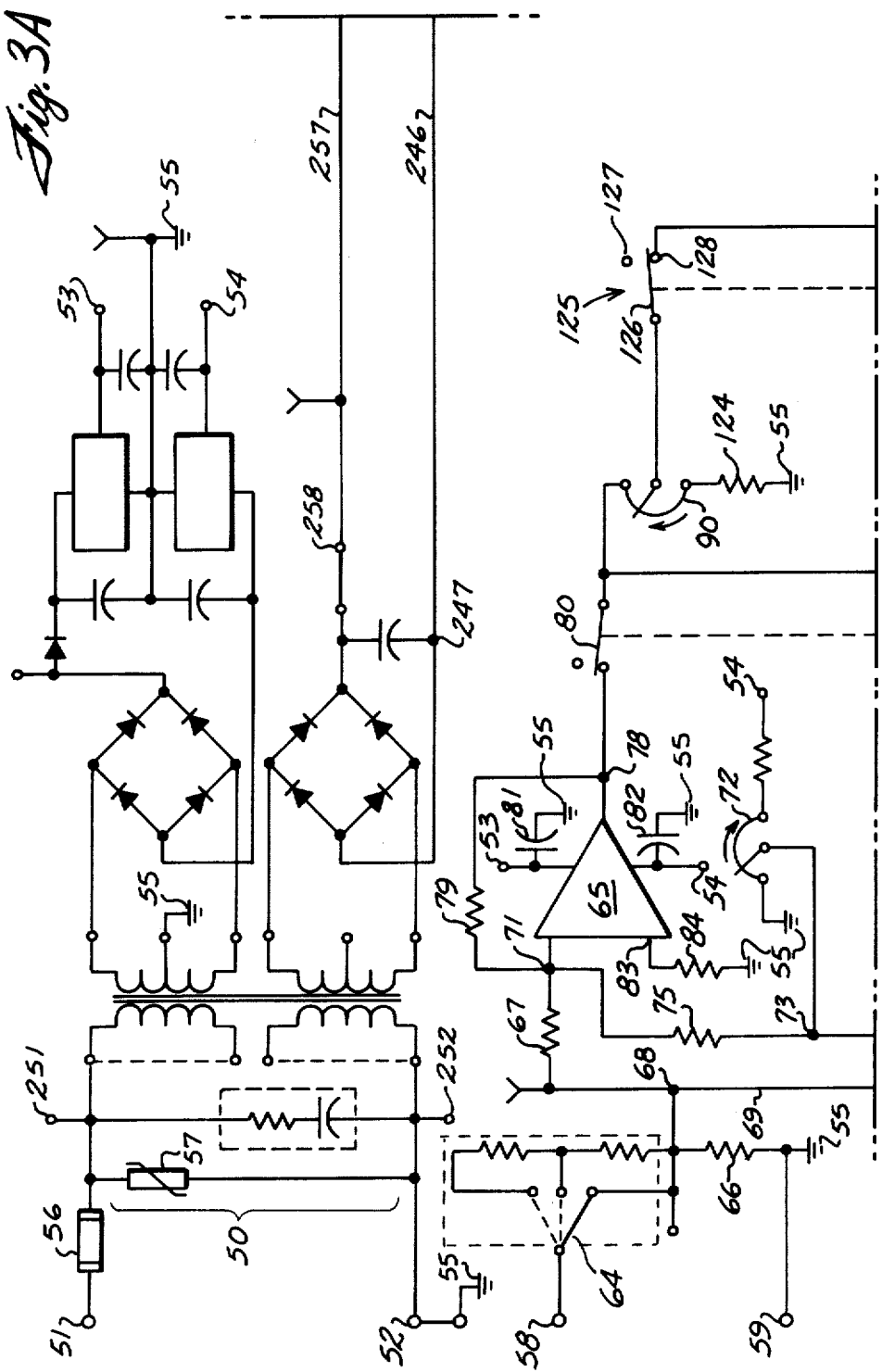
Figure 3B:
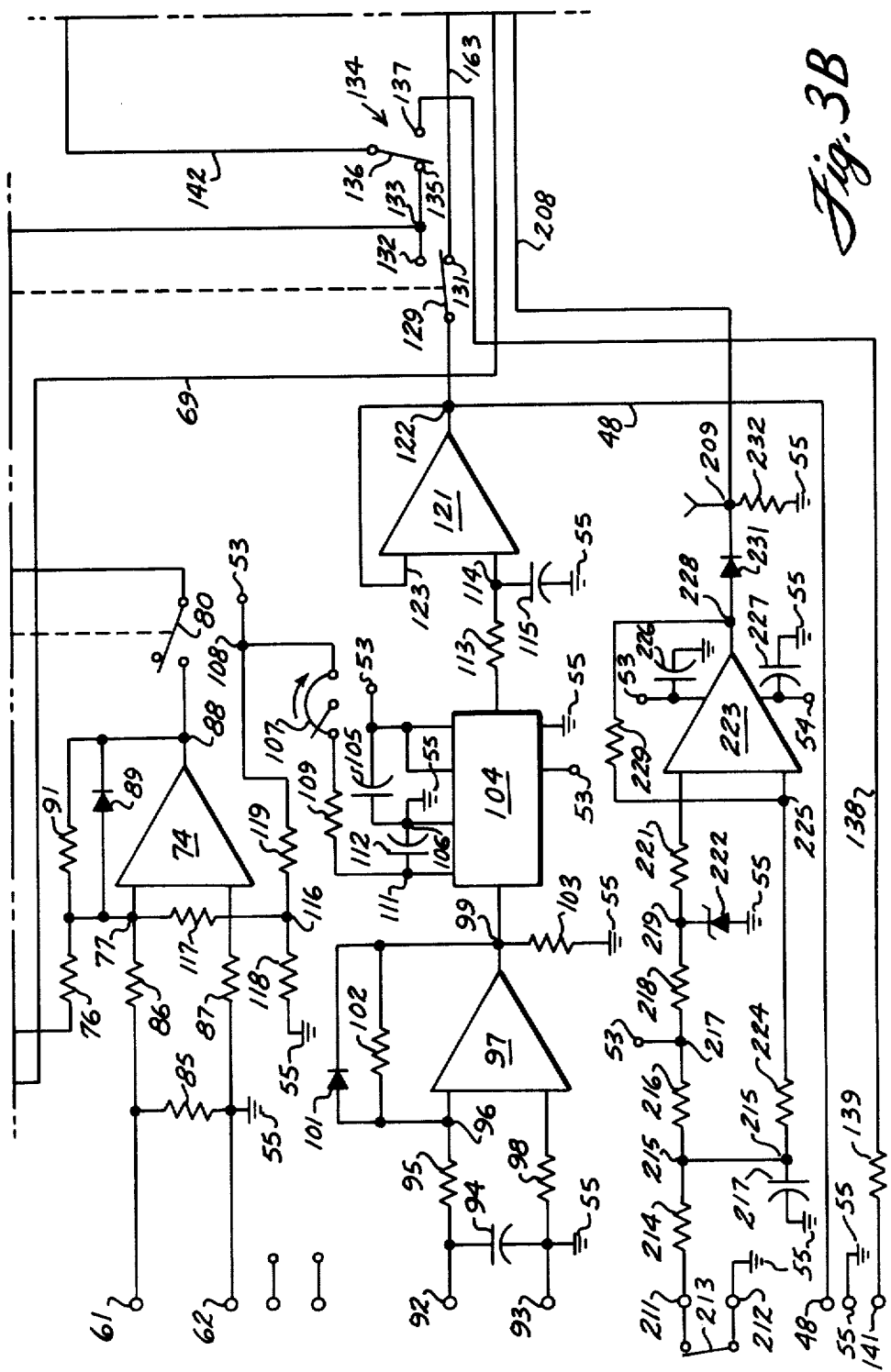

Inputs to the control circuit that are the outputs of sensing devices in the area to be cooled are applied across terminals 58 and 59 in voltage form, across terminals 61 and 62 in current form and through the pressure terminal 63 (in FIG. 3C) as a voltage which is representative of the sensed pressure. Input adaptor means 64 with its selective resistance couplings present the proper voltage range as the input to the summing amplifier 65. A resistor 66 is connected across the output of the input adaptor and ground to maintain minimum input voltage. A resistor 67 is connected between: a junction 68 to which are also connected the output of the adaptor 64 and a connector 69 through which the voltage representative of a sensed pressure is derived from terminal 63; and a junction 71. A variable resistance means 72 is used to set the minimum speed of the fan to be driven by the servo-motor controlled by this circuitry. This minimum speed control 72 is connected between a negative voltage source 54 and a junction 73. From junction 73, it is connected as a limiting voltage on the inputs of both the voltage input summing amplifier 65 and a current input summing amplifier 74 as seen in FIG. 3B. These connections are made from junction 73 through a resistor 75 to junction 71 to the inverting input of summing amplifier 65; and from junction 73 through a resistor 76 to a junction 77 to the inverting input of summing amplifier 74.

The output of the summing amplifier 65 is applied to a junction 78 to which is connected a feedback connector including a resistance 79, said connector is also connected to junction 71. In the power supply for the amplifier 65 are capacitors 81 and 82 which are by-pass capacitors to suppress power supply transients. Resistor 79 provides for gain programming. The non-inverting input 83 to inverting amplifier 65 is connected to ground 55 through a resistor 84.

The output signal at junction 78 is a voltage analog signal representative of the output of the input scaling network 17 and buffer amplifier 18 as shown in FIG. 2.

The circuit provided to convert a current input at terminals 61 and 62 into a voltage that is compatible with the circuitry following the scaling network 17 discussed above, is a resistance 85 connected across current input terminals 61 and 62. A resistor 86 is equivalent to the resistor 67 above and resistor 87 is equivalent to resistor 84 above. The inverter amplifier 74 produces an output at junction 88 which is a voltage representative of the temperature sensed by a current sensing means. The feedback circuitry for amplifier 74 includes a diode 89 and a resistor 91 connected parallel thereto. Diode 89 is connected so as to assure that no negative feedback signal will be applied to the input of the amplifier 74. The feedback network is connected from junction 88 to junction 77 and the inverting input of amplifier 74. A selector switch 80 is used to connect the output of the voltage input circuitry available at junction 78 or the output of the current input circuitry available at junction 88 to the remainder of the circuitry.

Obviously the setting of switch 80 depends upon whether a voltage or a current input is utilized.

A maximum speed control 90 is connected to the output of switch 80. Control 90 is a variable resistor providing a current-resistance drop from zero to cover a range compatible with the system. The highest I-R drop is isolated from ground 55 by a limiting resistor 124.

The feedback signals generated by the magnetic pickup sensing the speed of the supply fan are applied to the circuit through terminals 92 and 93. A noise filtering capacitor 94 is connected across such terminals. A resistor 95 between one side of capacitor 94 and a junction 96 at the input of a squaring amplifier 97. A resistor 98 is connected between the other side of capacitor 94 and the other input of squaring amplifier 97. The last said side of capacitor 94 is connected to ground 55. The output of the squaring amplifier is applied to a junction 99 and is in the form of digital pulses the frequency of which is proportional to the speed of the supply fan. The feedback connection between junction 99 and junction 96 includes a diode 101 and a resistance 102 connected in parallel. The diode is directed so as to prevent negative valued feedback signals. A loading resistor 103 is connected between junction 99 and ground 55.

Also connected to junction 99 is the input of a one-shot timer 104 which trims the output of the squaring amplifier 97 so that the pulse widths are all the same. Power is introduced to timer 104 from power supply positive output 53. A power supply by-pass filter capacitor 105 is connected between supply 53 and ground 55 through a junction 106. A feedback adjusting means 107 is connected at one end to positive supply 53 through a junction 108 and at the other end to a resistance 109 and a junction 111. The feedback adjusting means 107 is a variable resistor 107 which establishes the voltage to revolutions per minute relationship. Means 107 also changes the width of the pulses so as to calibrate different duty cycles. It raises the voltage for a capacitor 115. Between junctions 111 and 106 is connected a capacitor 112 which provides the time constant for the pulse train. Junctions 111 and 106 are connected as inputs to the timer 104, which integrates pulses into an analog form.

In the current input circuit with inputs 61 and 62, connected between junction 77 and a junction 116 is a resistor 117 which provides a one volt offset to keep amplifier 74 inoperative until a sufficient input circuit is applied thereto. Connected between junction 116 and ground 55 is a resistor 118. Connected between junctions 116 and 108 is a resistor 119. Resistors 118 and 119 are scaling resistors to provide the one volt offset.

The output of timer 104 is applied through a resistor 113, a junction 114, to an input to a buffer amplifier 121. A capacitor 115 is connected between junction 114 and ground 55. At junction 114 an analog voltage is produced which has a magnitude proportional to the frequency at input terminals 92 and 93. This analog voltage is applied as an input to buffer amplifier 121 which tracks the voltage across capacitor 115. The buffer amplifier 121 is the interface between the timer and the rest of the circuit. The output of buffer amplifier is applied to junction 122 from which a feedback connector which supplies a second input 123 to buffer 121. Also connected to junction 22 is an auxiliary output through connector 48 as discussed in FIG. 2.

The output of the maximum speed control 90 being a voltage that is representative of the temperature of the area to be cooled; and the output of the buffer amplifier 121 being a voltage that is representative of the speed of the supply fan, are available as inputs to a return fan control as shown in FIG. 2. Switch 125 is included herein to provide for the selection of: the output of maximum speed control 90 for normal operation; or the output of the buffer 121 for an operation in which the return speed is controlled relative to the speed of the supply fan.

A ganged switch 125 with a connector 126 which can be moved to contact 127 in the follow mode or to contact 128 in the normal mode. No other circuitry is connected to terminal 127. The input to switch connector 126 is the controlled output of the maximum fan speed control 90. The second connector 129 of ganged switch 125 is connected from the junction 122 which carries the analog representation of the speed of the supply fan to a terminal 131 for the normal mode of operation, or to a terminal 132 for the follow mode of operation. In the normal mode, the switch connector 126 is in contact with terminal 128 and is connected to a terminal 133 to which terminal 132 is also connected. A switch 134 for the selection of manual or automatic operation has a first terminal 135 connected to junction 133 providing the automatic system operation connected to switch connector 136; and has a second terminal 137 providing the manual system operation connection of switch connector 136.

The system and mode switches 125 and 134, respectively, provide the following options: with the switches set as shown in the drawings, a return fan connected thereto would operate in a manner to be controlled by the temperature sensor in the area to be cooled, as in the supply fan, and the speed of the return fan would be controlled by speed differential adjustment in FIG. 2. Further, as determined by switch 134, the control of the cooling system would be automatic as determined by this circuitry, responding to the said temperature sensor and the speed of the supply fan. To alter the positions of ganged switch 125 would disconnect the temperature sensors from the circuit and would connect the supply fan speed signal to be the sole controlling input. Changing switch 134 to the manual position would deactivate the temperature sensor inputs and also the supply fan speed feedback input. The only input available would be a signal supplied to the manual terminal 137 of switch 134 through a connector 138, a resistor 139 and from across a terminal 141 and ground 55.

Figure 3C:
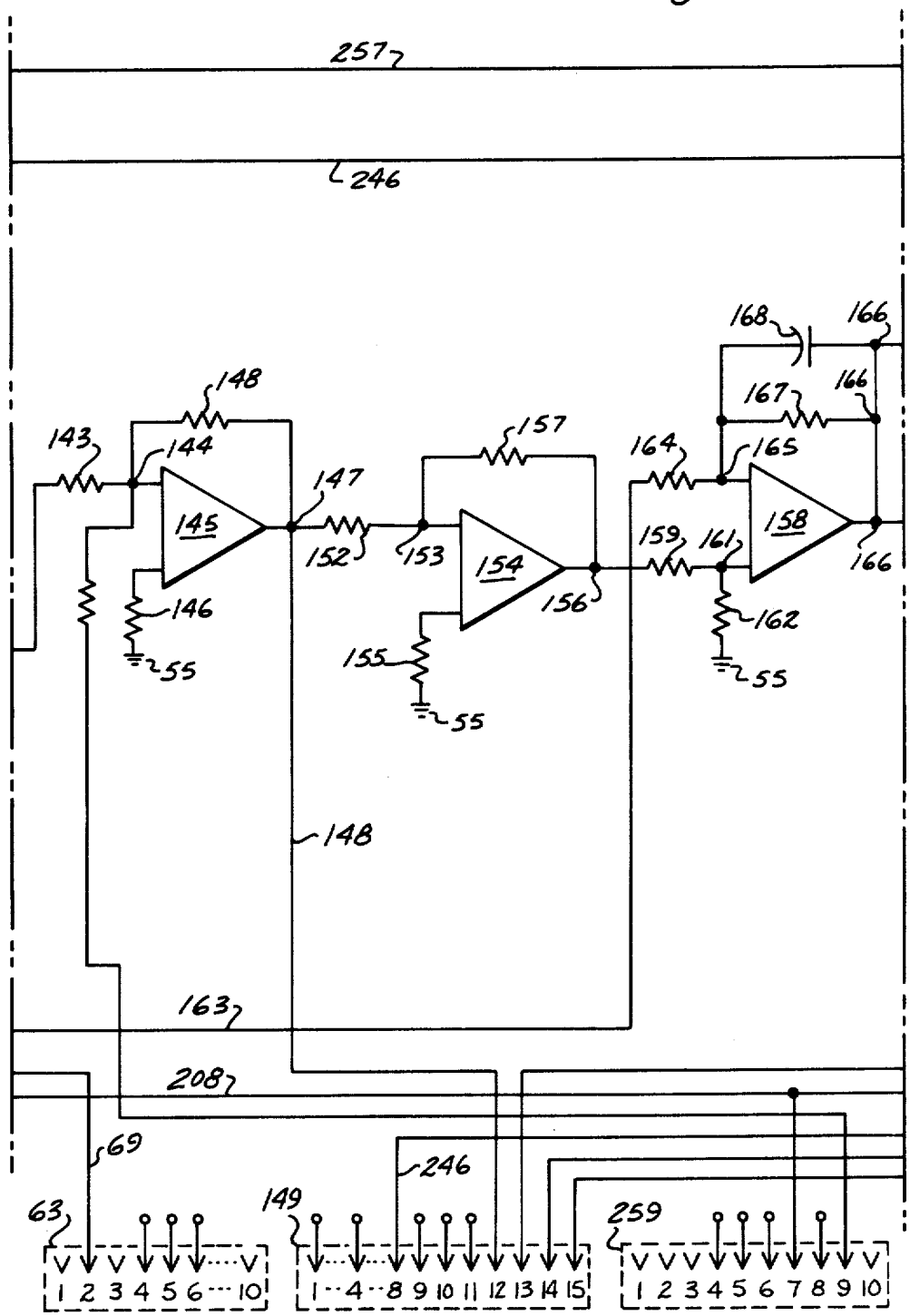

As seen in FIG. 3C, from the switch connector 136 in switch 134, the selected controlling voltage is supplied through a connector 142 across a resistor 143 to a junction 144. The inverting input of an inverting amplifier 145 is connected to the junction 144. The non-inverting input of amplifier 145 is connected through a resistor 146 to ground 55. The inverted output of amplifier 145 is connected to a junction 147 to which the normal amplifier feedback connector includes a current limiting resistor 148, and is connected back to junction 144. This invention is provided to meet the requirements of the return fan control to be summed with another circuit and is supplied from junction 147 through connector 148, terminal 12 in dual drive terminal 149 to combining circuit 151 shown in FIG. 2. Also connected to junction 147 through a resistor 152, a junction 153 is the inverting input to inverting amplifier 154 which reinverts the previously inverted signal to meet the requirements of the next stage of this circuit. The non-inverting input to amplifier 154 is connected through a resistor 155 to ground 55. The feedback loop is connected from a junction 156 at the output of the amplifier 154 back to the junction 153, and includes a resistor 157. Inverting amplifiers 145 and 154 are for inverting the input signals for the stated purpose and then reinverting them for application as the reference, or non-inverting input to a difference amplifier 158 that actually determines the direction of adjustment that the servo-motor will operate to either speed-up or slow-down the supply fan or to provide the no-change condition.

The output of amplifier 154 is connected from junction 156 through a resistor 159, and a junction 161 to the non-inverting input of amplifier 158. A current limiting resistor 162 is connected between junction 161 and ground 55.

The feedback voltage representation of supply fan speed is connected from the output of buffer amplifier 121 across terminal 122, through switch 125 with its connector 129 in contact with the normal mode of operation terminal 131, through a connector 163 through a resistor 164 and a junction 165 to the inverting input of the difference amplifier 158. This is the input to be compared with the reference input and is, therefore, to be the parameter controlled by this circuit.

In the feedback circuit for the difference amplifier 158 are a resistor 167 and a capacitor 168 connected in parallel between junctions 166 and 165.

Figure 3D:
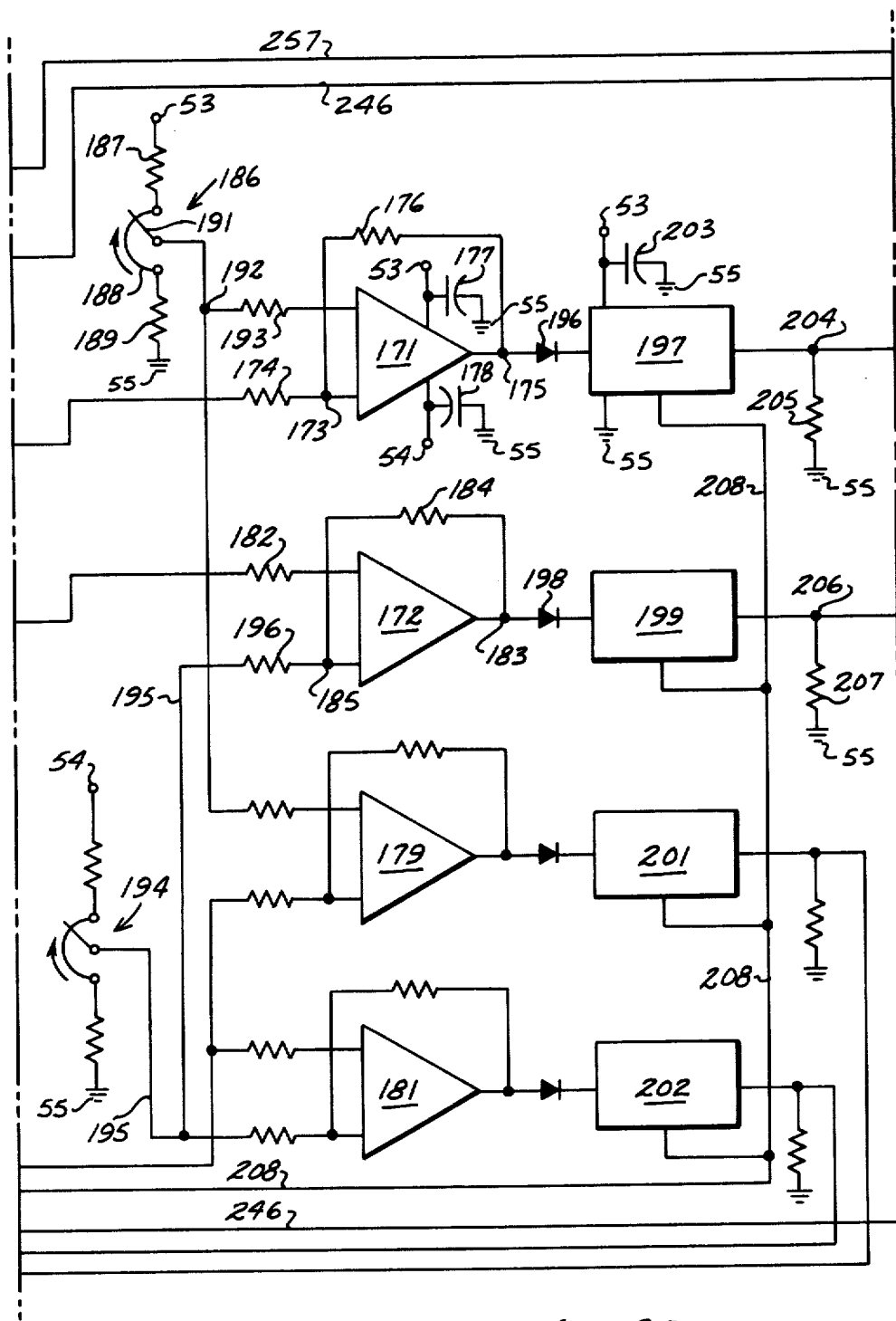

FIG. 3D shows the circuitry for setting the deadtime of the control so that fluctuations around zero voltage will not be permitted to cause toggling of the switches that operate the servo-motor. FIG. 3D further shows the solid state switches that operate in response to control signals from the difference amplifier 158.

Since this circuit is adapted for the operation of a supply fan and/or a return fan, FIG. 3D includes circuitry for both to show the interactions thereof.

For the supply fan control, a pair of comparing amplifiers 171 and 172 are provided. Amplifier 171 is connected with its non-inverting input connected through a junction 173 across a resistor 174 to output junction 166 of difference amplifier 158 resulting in the production of an output at junction 175 when the output of the difference amplifier 158 is positive. The feedback loop for the amplifier 171 has a resistor 176 serially connected between junctions 175 and 173, the latter being the non-inverting input. Connection to the power supply 53 and 54 with capacitors 177 and 178 connecting each side, respectively, to ground 55 give the comparators protection from power source transients. Each of the comparators 171, 172, 179, and 181 are similarly powered.

Comparator amplifier 172 is connected with its inverting input connected through a resistor 182 to output junction 186 of difference amplifier 158 resulting in the production of an output at junction 183 when the output of the difference amplifier 158 is negative. The feedback loop for the amplifier 172 has a resistor 184 serially connected between junctions 183 and 185 connected to the non-inverting input thereto.

A deadtime control 186 for positive outputs of difference amplifier 158 is connected from a positive power supply terminal 53. The deadtime control 186 includes a fixed resistance 187, variable resistance 188 and a second fixed resistance 189 connected between said positive terminal 53 and ground 55. The moving contact 91 of the variable resistor 188 is connected across a junction 192 through a resistance 193 as the inverting input to the comparator amplifier 171. When the positive input through junction 173 to comparator 171 is minimal, no output will be produced thereby until the selected positive voltage on the inverting input is exceeded, thereby giving a bandwidth control for the deadtime of the control output.

A deadtime control 194 for negative outputs of difference amplifier 158 is connected from negative power supply terminal 54. The structure of control 194 is identical with that of control 186 with the exception of the negative power input thereto. The output thereof is applied to the non-inverting input of the comparator amplifier 172 is connected by a connector 195 through a resistor 196 to junction 185 and the non-inverting input of comparator 172.

The output of comparator 171 at junction 175 passes through a diode 196 to a solid state switch 197. The output of comparator 172 at junction 183 passes through a diode 198 to a solid state switch 199. The diodes 196 and 198 are polarized so as to prevent any negative signals from being applied to the switches 197 and 199 since only positive inputs activate the switches. Each of the four solid state switches 197, 199, 201, and 202 are powered by positive power supply terminal 53 with a capacitor such as 203 to remove transients. The said four solid state switches are to open the circuits that supply control signals during start-up of the system so as to permit fans to come up to speed before introducing control thereto, or to cut off the control in emergencies when desired. The delay provision will be discussed later in this specification.

The circuitry shown for the control of positive comparing amplifier 179, negative comparing amplifier 181, solid state switches 201 and 202 is for the control of the return fan servo-motor and is included to show how the interconnection of such circuits is accomplished. That is, the positive deadband control is connected to the comparators responding to positive inputs, and the negative deadband controls are connected to the comparators responding to negative inputs.

The output of solid state switch 197 is applied to a junction 204 to which a resistor 205 is connected to ground 55. The output of solid state switch 199 is connected to junction 206 to which a resistor 207 is connected to ground 55.

The solid state switches 197, 199, 201, and 202 are opened by a signal applied to each through a connector 208 connected to a junction 209 to which the output of the ON-OFF and delay circuit connected to terminals 211 and 212, as shown in FIG. 3B. The system operator uses a switch 213 which shorts terminals 211 and 212. Terminal 212 is connected to ground 55. Connected to terminal 211 is a limiting resistor 214 connected at its other end to a junction 215 to which is also connected the time delay circuit made up of a resistor 216 and a capacitor 217. One side of each of the resistor 216 and the capacitor 217 is connected to junction 215. The other side of the capacitor 217 is connected to ground 55 and the other side of the resistor 216 is connected to a junction 220 to which positive power supply 53 is also connected. Between junction 217 and the inverting input of a comparator amplifier 223 are serially connected: a resistor 218, a junction 219, and a resistor 221 which are scaling resistors for a Zener diode 222. Connected between junction 219 and ground 55 is a Zener diode 222 which is oriented to saturate at a predetermined positive voltage level. The non-inverting input to comparator 223 is connected from junction 215 through an amplifier input resistor 224 and a junction 225. The comparator is powered from positive source 53 and negative source 54 and supplied with transient suppressing compacitors 226 and 227, respectively. The feedback for the comparator is connected to a junction 228 to which the output of the comparator 223 is connected. A resistor 229 is serially connected between output junction 228 and non-inverting input junction 225. Between junctions 228 and 209 is connected a diode 231 which permits only positively polarized voltages to pass through junction 209 and connector 108, to the four shown solid state switches 197, 199, 201, and 202. Resistor 232 is connected between junction 209 and ground 55 to limit the voltage on connector 208.

Before the system operator inserts his key, or short means across terminals 211 and 212, capacitor 217 is discharged to zero value at ground 55. Opening the terminals 211 and 212 caused the voltage from source 53 to flow through the time delay R-C circuit made up of resistor 216 and capacitor 217. Capacitor 217 begins to charge for a time depending upon the time constants of the delay circuit until the voltage level of the Zener diode 222 is reached. This is the delay that provides for the fan to come up to speed before the control circuit is cut on. At this time, comparator 223 switches from providing a negative output to provide a positive output of sufficient voltage to close the four solid state switches of FIG. 3D. Shorting of the switch 213 will cause capacitor 217 to discharge to ground 55 and thereby reduce the level of the input on the inverting input of comparator 223 to prevent positive outputs therefrom, thereby cutting off the four solid state switches and deactivating the control.

Figure 3E:
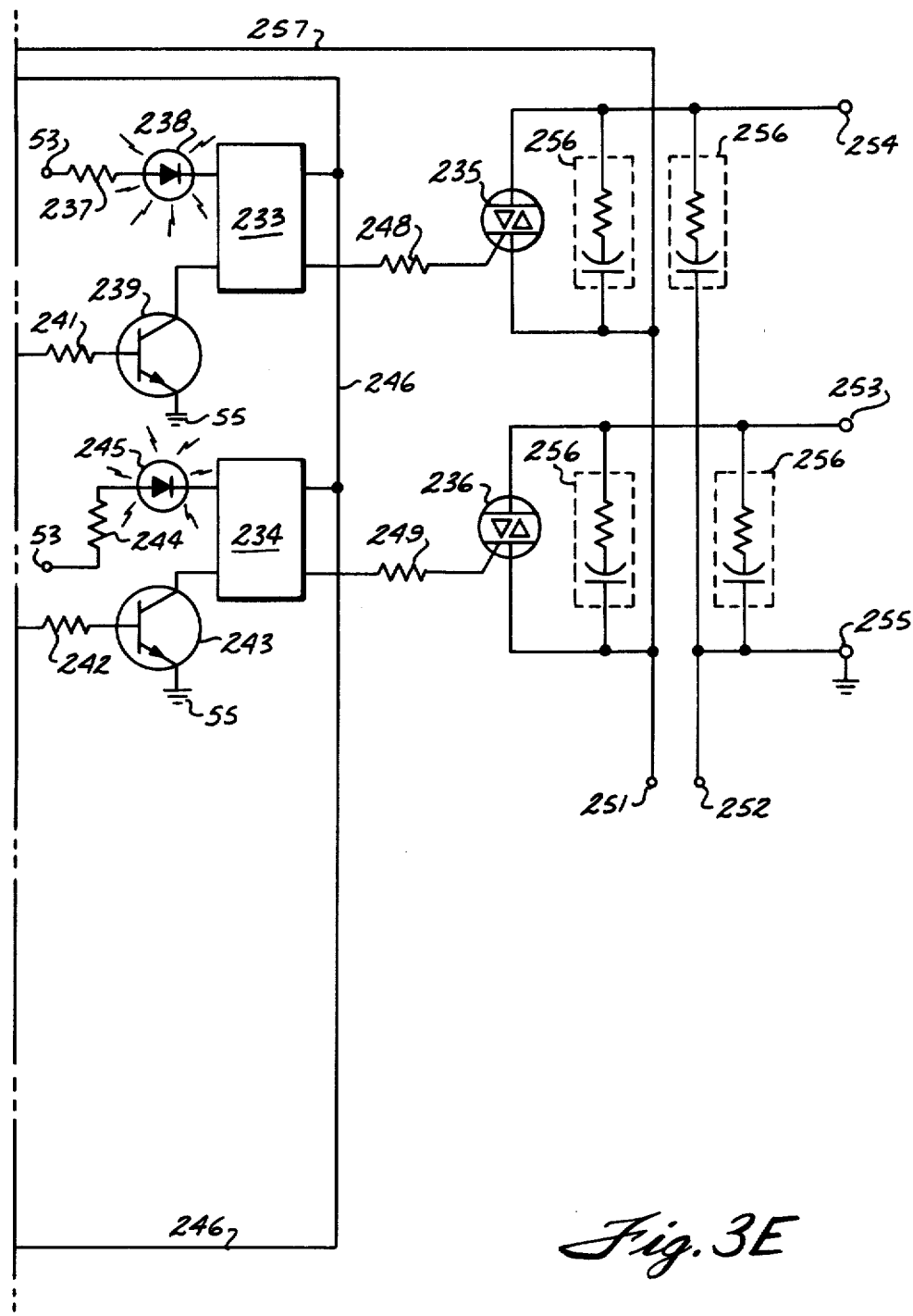

In FIG. 3E is shown the driving means for the triac which provide the outputs to control the three wire reversible 110 volt servo-motor 5 as shown in FIG. 1. A pair of optically isolated drivers 233 and 234 provide the driving signals to enable the triacs 235 and 236, respectively. Current is supplied to the optically isolated drivers by a circuit connected to positive power source 53 as shown in FIG. 3A and includes a limiting resistor 237, a light emitting diode 238 mounted on a panel available to the system operator and oriented to pass positive voltage therethrough to the optically isolated driver 233, the collector of a transistor switch 239 and through the emitter thereof to ground 55 in a serial connection. The base of transistor 239 is connected to junction 204 through a limiting resistor 241. At junction 204 are the signals that indicate that the servo-motor 5 is to rotate in a clockwise direction to speed up the fan. A signal on the base of transistor 239 sufficient to cut it on causes a current to flow through the limiting resistor 237, light emitting diode 238 to indicate that the servo-motor is operating in a clockwise direction, the optically isolated driver 233, the collector and the emitter of transistor 239 to ground 55.

The same circuit configuration is used for the current applied to optically isolated driver 234. That is, inputs from junction 206 indicate that the servo-motor is to be operated counter-clockwise to slow the fan. A signal from junction 206 through a limiting resistor 242 to the base of a transistor 243 causes a current to flow through the serially connected circuit from positive voltage source 53, a limiting resistor 244, a light emitting diode 245 mounted on the aforesaid panel and oriented to pass positive voltage therethrough to the optically isolated driver 234, through the collector and the emitter of transistor 243 to ground 55. Light visible from diode 245 indicates that the servo-motor 5 is turning in a counter-clockwise direction to slow down the fan.

From the power supply 50 as shown in FIG. 3A, a connector 246 connected to output 247, on the power supply 50, and to each of the optically isolated drivers 233, 234 and terminal 8 of a dual driver terminal 149 shown in FIG. 3C to connect to the drivers for the return fan control. Connector 246 supplies a DC bias voltage that maintains the optically isolated drivers in operable condition as long as an input signal is applied from the deadband controls through the solid state switches.

The triac driving signal from optically isolated driver 233 is applied through a limiting resistor 248 to turn-on the gate of triac 235. The triac driving signal from optically isolated driver 234 is applied through a limiting resistor 249 to turn-on the triac 236. A 110 AC voltage taken from outputs 251 and 252 in the power supply 50 of FIG. 3A are applied as inputs to the circuitry for applying inputs to the three-wire 110 volt reversible servo-motor 5 under the control of the triacs. Power terminal 251 is connected to anode 2 of triac 236 and anode 1 thereof is connected to a terminal 253 for presenting the counter-clockwise input power to the servo-motor 5. Power terminal 251 is also connected to anode 2 of triac 235 and anode 1 thereof is connected to a terminal 254 for presenting the clockwise input power to servo-motor 5. Connected to power terminal 252 is a common output terminal 255 connected to the third wire of the servo-motor power input. A plurality of transient suppressing resistance-capacitance circuits 256 are provided to absorb the jerk-back voltage to protect the triacs. One such R-C circuit 256 is connected across the anode 1 and anode 2 of triac 236, one across the common output terminal 255 and the counter-clockwise voltage terminal 253, one across anode 1 and anode 2 of triac 235, and one connected across the common output terminal 255 and the clockwise voltage terminal 254. A connector 257 is connected from the terminals at which the input source 251 is connected to a terminal 258 at an output of the power supply 50. Connector 257 supplies a DC bias to maintain the triacs in operative condition as long as an input is produced at their gates from the optically isolated drivers. With such biasing, as is provided to the optically isolated drivers and the triacs, the servo-motor 5 can operate as long as is required to set the proper fan speed determined by this control.

It is to be noted that for a thirty inch centrifugal fan operating between 623 revolutions per minute and 1342 revolutions per minute, the fan horsepower at these speeds are 1.92 and 18.22 respectively. The energy savings are obvious when the fan is operated at less than full speed, which is true of the operational capabilities afforded by this invention.

While the invention is susceptible of various modifications and alternative forms, a specific embodiment thereof has been shown by way of example in the drawings and described above. It should be understood, however, that it is not intended to limit the invention to the particular form disclosed but, on the contrary, the intention is to cover all modifications, equivalents and alternatives falling within the spirit and scope of the invention as expressed in the appended claims.

We claim:

1. In a variable air volume cooling system,
fan means for blowing air into an area to be cooled,
means for varying the amount of air blown into said area including a driver variable pitch pulley means, a driven variable pitch pulley means, and a belt means connected between said driver and driven pulley means, whereby changes in the pitch of said driver pulley means varies the diameter of the belt on said driver to effect changes in the speed of said fan means, driving motor means connected to said driver pulley means, servo-motor means mounted to drive a means for effecting changes in the pitch of the driver pulley means; a first electrical signal derived from a temperature sensing means in said area to be cooled, pulse generating means connected to said fan means producing second signals indicative of the speed thereof, means for comparing said first and second signals to produce a control signal which is connected to said servo-motor means to effect a change in said diameter, said means for comparing including: means for shaping said signal to be the actual temperature condition signal applied to the inverting input of a difference amplifier means; means for converting the pulses of said second signal into an analog reference signal connected to the non-inverting input of said difference amplifier means; means for adjusting the minimum speed of the fan means, means for adjusting the maximum speed of the fan means, said two adjusting means connected to said means for shaping said first signal; a first and a second comparator difference amplifiers are connected to the output of said difference amplifier whereby said first comparator produces output when the output of said difference amplifier is positive, and said second comparator produces outputs when the output of said difference amplifier is negative, the output of said first comparator is connected to a first solid state switch, the output of said second comparator is connected to a second solid state switch; said time delay means is connected to each of said solid state switches to effect the control deactivation until the fan reaches operating speed, the outputs of said solid state switches are connected to a first and a second current isolating driver means and to first and second triacs; the output of said first solid state switch is connected to said first current isolating driver means to which is connected said first triac, the output of said second solid state switch is connected to said second current isolating driver means to which connected said second triac; servo-motor power means connected to said triacs and said servo-motor so that driving signals on said first triac produce clockwise operation of said servo-motor and driving signals on said second triac produce counter-clockwise operation of said servo-motor.

2. The variable air volume cooling system of claim 1, and a return fan to relieve the pressures created by said fan means, and return control means for said return fan, said return control means duplicating the circuitry for the supply fan magnetic pick-up signal from the input terminal therefor to the non-inverting input to a return fan difference amplifier, the inverting input to said return fan difference amplifier selectable to be connected to one of the inputs to said first said difference amplifier, means to establish a difference between the speeds of said fan and said return fan connected to said inverting input to said return fan difference amplifier; and means for providing a servo-motor connected to said return fan speed means to determine the return fan speed in response to signals generated by said return fan difference amplifier.

3. In a control means for a variable air volume cooling system, a first input signal representative of the temperature of the area to be cooled, a second input signal representative of the speed of a cooling fan, a difference amplifier comparator means having an inverting input means and a non-inverting input means thereto, means for shaping said first input signal, means for connecting the shaped first input signal so as to be applied to the inverting input means of said comparator means, means for shaping said second input signal, means for connecting the shaped second input signal so as to be applied to the non-inverting input means of said comparator means, a positive responsive difference amplifier connected to the output of said comparator means so as to be enabled by positive outputs of said comparator means, a negative responsive difference amplifier connected to the output of said comparator means so as to be enabled by negative outputs of said comparator means, means for altering the level of positive signals applied to said positive responsive difference amplifier and means for altering the level of negative signals applied to said negative responsive difference amplifier whereby a preselected voltage level about zero voltage inputs to said last said two amplifiers prevents toggling thereof, a first signal switching means, a first and a second current isolated driver means, a first and a second power switching means, a power source to be switched, and a first, second and third output terminal for presenting a driving power to operate a servo-motor connected thereof; the output of said positive responsive difference amplifier connected across said first signal switching means through said first driver means to be the enabling input to said first power switching means, thereby connecting said power source to said first and third output terminals for clockwise rotation of said servo-motor; the output of said negative responsive difference amplifier connected across said second signal switching means through said second driver means to be enabling input to said second power switching means thereby connecting said power source to said second and third output terminals for counterclockwise rotation of said servo-motor; and timer means connected to said first and second signal switching means to isolate the remainder of the circuit so as to deactivate this control means when necessary.

* * * * *